United States Patent
Xu et al.

(10) Patent No.: US 11,483,324 B2
(45) Date of Patent: Oct. 25, 2022

(54) DETECTION OF MALICIOUS ACTIVITY USING BEHAVIOR DATA

(71) Applicant: SHAPE SECURITY, INC., Mountain View, CA (US)

(72) Inventors: Ye Xu, Santa Clara, CA (US); Yao Zhao, Fremont, CA (US); Xinran Wang, San Ramon, CA (US); Jarrod Overson, Santa Clara, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 0 days.

(21) Appl. No.: 15/986,709

(22) Filed: May 22, 2018

(65) Prior Publication Data

US 2019/0166141 A1 May 30, 2019

Related U.S. Application Data

(60) Provisional application No. 62/593,236, filed on Nov. 30, 2017.

(51) Int. Cl.
*H04L 29/06* (2006.01)
*H04L 9/40* (2022.01)
*G06N 3/04* (2006.01)
*G06N 20/00* (2019.01)

(52) U.S. Cl.
CPC ....... *H04L 63/1425* (2013.01); *G06N 3/0472* (2013.01); *G06N 20/00* (2019.01); *H04L 63/1416* (2013.01)

(58) Field of Classification Search
CPC .......... H04L 63/1425; H04L 63/1416; H04L 63/145; H04L 63/1433; G06F 21/50; G06F 21/577
USPC .......................................... 726/23
See application file for complete search history.

(56) References Cited

U.S. PATENT DOCUMENTS

| | | | |
|---|---|---|---|
| 8,997,226 B1 * | 3/2015 | Call | H04L 63/1416 726/22 |
| 9,369,438 B2 * | 6/2016 | Harrison | H04L 63/0281 |
| 10,360,380 B2 * | 7/2019 | Maisel | G06F 21/563 |
| 2016/0112440 A1 * | 4/2016 | Kolton | H04L 63/101 726/1 |
| 2017/0076224 A1 * | 3/2017 | Munawar | G06N 3/084 |

* cited by examiner

*Primary Examiner* — Longbit Chai
(74) *Attorney, Agent, or Firm* — Troutman Pepper Hamilton Sanders LLP

(57) ABSTRACT

Techniques are provided for detection of malicious activity using behavior data. A behavior model is trained with behavior data generated in association with a plurality of requests. Data is received that describes a particular request from a particular client device to a server system hosting a website. The data includes particular behavior data generated at the particular client device in association with the particular request. The particular behavior data is analyzed using the behavior model to generate a behavior model result. An automation determination for the particular request is generated based on the behavior model result. The particular request is handled based on the automation determination for the particular request.

28 Claims, 5 Drawing Sheets

DETECTION OF MALICIOUS ACTIVITY USING BEHAVIOR DATA

CROSS-REFERENCE TO RELATED APPLICATIONS; BENEFIT CLAIM

This application claims the benefit of Provisional Appln. 62/593,236, filed Nov. 30, 2017, the entire contents of which is hereby incorporated by reference as if fully set forth herein, under 35 U.S.C. § 119(e).

FIELD OF THE DISCLOSURE

The present disclosure generally relates to security techniques applicable to computer systems, and relates more specifically to detection of malicious activity using behavior data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Attackers may use software, often referred to as a "bot" or "headless browser", which imitates a Browser by receiving instructions from a web server and autonomously generating requests based on those instructions. For example, a bot may receive a webpage, gather data in one or more objects defined in the webpage, and initiate a request for another webpage to gather additional data, as if a user using a browser was requesting a new webpage. Also for example, a bot may initiate and cause transmission of a request with data assigned to one or more parameters that correspond to fields in a webpage to simulate a user submitting data to a web server through a browser.

Attackers may use bots to commit many types of unauthorized acts, crimes or computer fraud, such as web site or content scraping, ratings manipulation, fake account creation, reserving rival goods attacks, ballot stuffing attacks, password snooping, vulnerability assessments, brute force attacks, click fraud, denial-of-service (DoS) attacks, bidding wars, and system fingerprinting attacks. As a specific example, a malicious user may cause a bot to quickly reserve products that are being offered for sale through a particular web site.

It is relatively common, for example, for illicit organizations to place malicious software, or malware, on client computers (e.g. smartphones, tablets, laptops, or desktops) owned by unrelated individuals, effectively gaining control of those client computers. The malware may then be used to intercept communications between the client and its user, or between the client and a server from which it is getting information and to which it is providing information. For example, such malware may, using a "man in the middle" attack, generate displays in a web browser that look like the legitimate displays from a bank or retail web site, but that act to induce a user to disclose private information (e.g. bank account or credit card information) that the malware then intercepts and forwards to entities that will use the information for illicit gain (e.g. identity theft).

Web server administrators may wish to prevent malicious users from attacking the site, while allowing legitimate users to use the site as intended. However, determining which requests are initiated by a legitimate user using and a malicious user may be difficult. For example, bot detection may be performed by collecting and evaluating browser property signals using a rule-based system. However, some attackers have started to randomize browser property signals to find a way to bypass defense system. This is one example of the evolving nature of bot detection campaigns. Because of this evolving nature, rule-based bot detection systems must be manually updated with new rules in order to maintain effective performance.

SUMMARY

The appended claims may serve as a summary of the invention.

Figure 1:
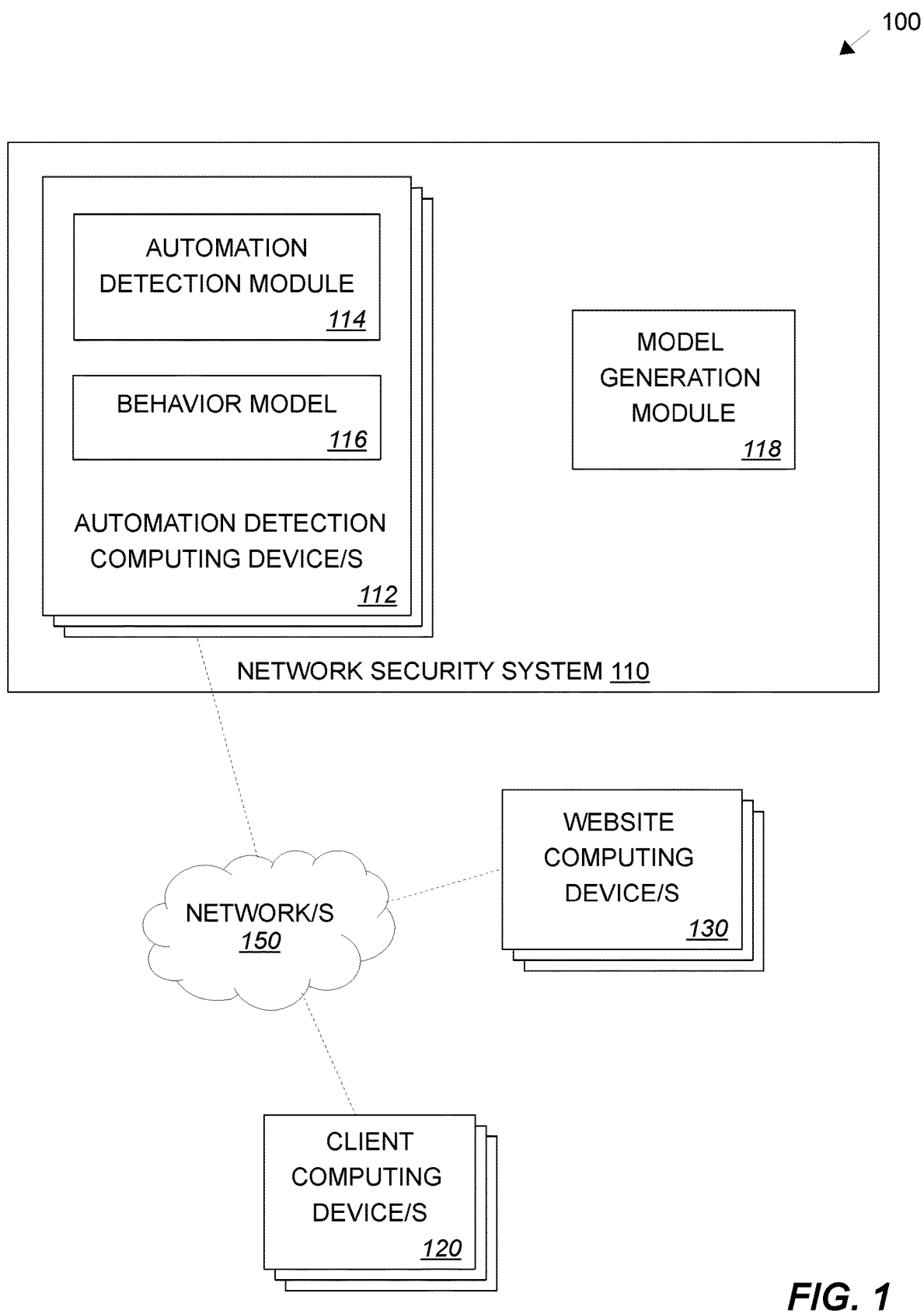
FIG. 1 illustrates a computer system that includes a network security system for detection of malicious activity in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

General Overview

This document generally describes systems, methods, devices, and other techniques for detection of malicious activity using behavior data. In general, a behavior model is generated using behavior data generated in association with a plurality of requests. An example of behavior data generated in association with a request is behavior data generated at a client computer in association with a log-in request. In some embodiments, deep learning techniques are used to train the behavior model using the behavior data. The behavior model is then used to determine whether a particular request submitted from a particular client computing device is an automated request. An automated request is a request that is initiated by an automated process rather than a human user.

In some implementations, the various techniques described herein may achieve one or more of the following advantages: a provider of an application—e.g. a Web application or native application—may better protect its users and itself from fraudsters. The protection may be provided relatively simply for the application provider in certain implementations, such as by simply having the application provider include in its own code a relevant piece of code that it obtains from the security service provider. In some implementations, such security can be added without the content provider having to install any new hardware or software on its own server systems. The security code can be provided flexibly by an organization that specializes in web security, which can in turn keep the security code updated to address ever-changing security threats. The security organization can also aggregate data received (e.g. the data that characterizes various clients, along with data that indicates whether they were determined to be legitimate or automated) across many clients that operate many domains, and can use that aggregated information to generate countermeasures that are more effective than countermeasures that could be developed using only data from a single domain.

Additional features and advantages are apparent from the specification and the drawings.

System Overview

FIG. 1 illustrates a computer system that includes a network security system for detection of malicious activity in an example embodiment. Computer system 100 includes one or more client computing device/s 120, one or more website computing device/s 130, and a network security system 110 that includes one or more automation detection computing device/s 112. The client computing device/s 120, website computing device/s 130, and the automation detection computing device/s 112 are communicatively coupled over one or more networks 150, such as the Internet. The network/s 150 may include one or more local area network/s (LAN) and/or one or more wide area networks (WAN) such as the Internet. Alternatively and/or in addition, two or more components, such as a website computing device 130 and an automation detection computing device 112, may be implemented on the same computing device. The techniques described herein may be performed on different network topologies involving one or more client computing devices 120, website computing device/s 130 and automation detection computing device/s 112. Example network topologies for automation detection are described in greater detail hereinafter.

The client computing device/s 120 can access content published by the website computing device/s 130 over network/s 150. For example, the client computer/s 102 may include a browser that executes web code and/or otherwise displays content provided by the website computing device/s 130. The content may include instructions or code that may be executed in a browser, browser-enabled application, or other software executing on the client computer/s 120. For example, the content may include HTML, JavaScript, and CSS, and other content. In some embodiments, the client computing device/s 120 include one or more computers, such as desktops, laptops, or any other computing device. In some embodiments, the client computing device/s 120 include one or more mobile devices, such as mobile devices running the Android platform, the Windows Mobile platform, or the iOS platform.

The website computing device/s 130 includes one or more server computers for one or more websites. The website computing device/s 130 may receive requests to access and/or interact with the content from users of the client computing device/s 120. For example, a request for content from a website may be initiated at a requesting client computing device 120 and received at a particular website computing device 130. The particular website computing device 130 may respond to the request by transmitting a response to the requesting client computing device 120, transmitting the response to another computing device that forwards the response to the requesting client computing device 120, sending instructions to another computing device to respond to the requesting client computing device 120, and/or any other technique or combination of techniques that cause the response to be provided to the requesting client computing device 120.

Network Security System

The network security system 110 analyzes one or more requests from the client computing device/s 120 to detect requests that are initiated by an automated process. In some embodiments, the network security system 110 includes one or more automation detection computing device/s 112. The automation detection computing device/s 112 analyze data describing a particular request to determine whether a particular request submitted from a particular client computing device 120 is initiated by malicious software rather than a human user. The malicious software may include a malicious software operating on the particular client computing device 120 to initiate the automated request, malicious software that spoofs, or falsifies, the identity of the particular client computing device 120, or other software that initiates automated requests that are potentially malicious.

Data describing a request may include the request itself, one or more parameters of the request, request metadata, data generated at the client computing device (such as but not limited to browser property signals), aggregate data generated by the network security system 110 that is related to the particular request and/or the particular client computing device 120, and other data that describes the request. Data describing the particular request may also include behavior data generated at the particular client computing device 120 in association with the request. Behavior data shall be described in greater detail hereinafter.

In some embodiments, the network security system 110 includes a model generation module 118. The model generation module 118 generates one or more behavior models 116 used by the automation detection computing device/s 112 to detect requests that are initiated by an automated process. The behavior model 116 is generated using behavior data associated with one or more requests. For example, the behavior model 116 may be generated using behavior data generated at a plurality of client computing devices 120 in association with a plurality of requests.

In some embodiments, a behavior model 116 is generated by applying deep learning techniques to the behavior data. For example, the behavior model 116 may be trained using behavior data associated with one or more requests, including behavior data associated with one or more human-initiated requests and/or behavior data associated with one or more automated requests. The use of deep learning techniques to generate and/or train the behavior model 116 is described in greater detail hereinafter.

The model generation module 118 may be implemented on one or more computing devices of the network security system 110, which may be the same as or different from one or more automation detection computing device/s 112. In some embodiments, the model generation module 118 is implemented on one or more separate computing devices that are distinct from the automation detection computing device/s 112. The separate computing device/s may generate, train, and/or otherwise update a behavior model 116 using behavior data. In some embodiments, after generating, training, or otherwise updating a current behavior model 116, the computing device/s provide the current behavior model 116 to the automation detection device/s 112.

Behavior Data

Behavior data describes user behavior at the client computing device/s 120. Behavior data includes any data that can describe human interaction with a client computing device 120. For example, behavior data may include data that describes input events at a client computing device 120. Input events occur when a user interacts an input device of the client computing device 120, such as when a user types into a keyboard, moves a mouse, touches a touchscreen, or otherwise interacts with an input device of the client computing device 120.

In some embodiments, behavior data may include sensor information generated by one or more hardware sensors of the client computing device 120, such as a GPS sensor, an accelerometer, a gyroscope, magnetometer, camera, microphone, thermometer, barometer, fingerprint reader, and/or other hardware sensors of the client computing device 120. For example, when a human user moves the client computing device 120, behavior data generated at the client computing device 120 may describe the movement, as indicated by sensor output.

Input events may be detected at a client computing device 120, such as when a user that interacts with web code using one or more input devices of the client computing device 120. Behavior data may describe one or more input events at the client computing device 120, such as but not limited to:
  single key strokes;
  multiple key strokes;
  mouse and/or cursor movement;
  stationary mouse and/or cursor position;
  mouse clicks;
  single touch events (stationary and moving);
  multi-touch events (stationary and moving);
  other input device events.

Behavior data may describe an input event as a set of input data elements. For example, when a key is pressed, the input event may be described by a key identifier, a stroke direction (up or down), and time data corresponding to the event. Time data corresponding to an event may include any data from which a timing and/or order of input events can be derived.

In addition to these features, some input events, such as a mouse input event, may include one or more positions (i.e. x, y for a 2-dimensional input device). More generally, behavior data may include any information that describes an input event, including one or more input data elements such as an input device type, one or more coordinate values, time data (such as but not limited to timestamps, duration and order), identifiers, and other data that describes an input event.

Behavior Data Collection at the Client Device

Techniques for detecting automated request may use behavior data that is generated at client computing device/s 120 in association with a request. Such behavior data may be obtained by monitoring behavior data at the client computing device 120. In some embodiments, behavior collection instructions are provided to the client computing device 120. When executed at the client computing device 120, the behavior collection instructions monitor behavior data generated at the client computing device 120.

When a client computing device 120 requests a website, the web code for the website may be served with or otherwise include behavior collection instructions that collect behavior data at the client computing device 120 when the web code is executed at the client computing device 120. The behavior collection instructions may include code written in JavaScript, HTML, or one or more other standard or proprietary languages that may be executed by a browser, execution environment, and/or computer processor.

When the client computing device 120 receives the web code and the behavior collection instructions, the web code and the behavior collection instructions are executed at the client computing device 120. For example, execution of the web code may cause display of an interactive website. The interactive website may be configured to allow a user to initiate one or more additional requests in response to the web code. For example, the web code may cause the client computing device 120 to render a webpage that allows a user to log in to an account managed by the website computing device 130.

When the behavior collection instructions are executed at the client computing device 120, the client computing device 120 monitors at least a portion of behavior data generated at the client computing device 120. When a human user interacts with the webpage on the client computing device 120, behavior data is generated. When a request is initiated at the client computing device 120, the executing behavior collection instructions may cause behavior data generated in association with the request to be submitted. For example, the behavior data may be submitted as part of the request, in the same communication as the request, in a different communication than the request is submitted in, or otherwise submitted in response to the submission of the request.

For example, when the webpage is a log-in page, a user may select a first text field, enter his username, select a second text field, enter his password, and click "Log In", thereby initiating a login request. When the login request is initiated, the client computing device 120 generates and transmits a request over the network/s 150. In some embodiments, as the user interacts with the webpage, the executing behavior collection instructions collect behavior data corresponding to the user's actions, such as the mouse movements, mouse clicks, and keyboard inputs. If the client computing device is a touch-enabled device, the behavior collection instructions may collect data corresponding to touch interactions, including touch interactions with a virtual keyboard (e.g. a keyboard image displayed on a display of the client computing device 120). After the user clicks "Log In", causing initiation of the login request, the behavior collection instructions may identify the relevant behavior data that was generated in association with the request and cause submission of the relevant behavior data. For example, the behavior collection instructions may determine that behavior data involving the first text field, the second text field, and the "Log In" button are generated in association with the login request. Login requests are used in one or more examples hereinafter, but the techniques described herein apply to other types of client requests.

Automation-Generated Behavior Data

When an automation process interacts with web code that includes behavior collection instructions, the behavior collection instructions may still attempt to collect behavior data when executed, even though a non-human user is behind the interaction. Such automation-generated behavior data may be incidental to the operation of the automation process, or may be an attempt of the automation process to emulate a human user's interactions. In some instances, behavior data generated in association with an automated process may include one or more omitted values, null values, origin values, or otherwise blank values.

The following factors may differentiate human-generated behavior data and automation-generated behavior data:
  speed of one or more input events and/or transitions between input events;
  rate of input events and/or transitions between input events;
  randomness of position and/or movements associated with one or more input events;
  uniformity of position and/or movements associated with one or more input events;
  lack of meaningful input events;
  lack of meaningful movement between input events;
  the client computing device type is not compatible with an input event type generated;
  one or more positions associated with one or more input events within the context of a rendered area.

When analysis of the behavior data generated in association with a request indicates that the request is likely initiated by an automated process, the request may be handled in a different manner than requests that are likely initiated by a human user. For example, the request may be handled by blocking the request, blocking a domain associated with the request, blocking an address or account associated with the request, or flagging the request for further review and/or handling. The following behavior patterns may indicate that an automated process is interacting with web code on a client computing device 120 rather than a human user:
  very fast keystroke events in succession;
  very short duration between a key-down event and a key-up event of the same key;
  two or more keys pressed quickly;
  highly uniform duration between key events;
  mouse, touch and/or cursor movements that are too randomized;
  mouse, touch and/or cursor movements that are too straight or otherwise uniform;
  lack of mouse, touch and/or cursor movement;
  lack of mouse, touch and/or cursor input;
  mouse, touch and/or cursor movement remaining in an origin position, such as (0,0);
  mouse, touch and/or cursor does not move between two or more click/touch events;
  mouse click events on a mobile device that has touch input;
  touch events on a computing device without touch input;
  other input events on a computing device that are not compatible with the computing device;
  click and/or touch events on the same location(s) on different renderings of the same page or content;
  repeated click events and/or touch events on same position and/or pixel;
  speed of mouse movement doesn't decrease when mouse moves towards a target (e.g. button).

Machine Learning and Deep Learning Techniques

Machine learning techniques allow computers to make predictions based on training data without being explicitly programmed. Generally, machine learning techniques involve a model, a cost function for evaluating the effectiveness of the model, an optimization procedure to minimize cost function in the training phase, and training data used to train the model. A core objective of machine learning is to generate a model that generalizes from its exposure to a training data set to accurately process new data not previously encountered (e.g. data outside of the training data set).

In some embodiments, one or more machine learning techniques are applied to behavior data to generate one or more behavior models usable for detection of malicious activity. The machine learning techniques may include one or more deep learning techniques.

Neural networks, which is a classical machine learning technique, is loosely based on biological neurons. Typically, a model includes an arrangement of nodes or elements that are modeled loosely on neurons. These nodes are arranged in layers of "neurons" that form a "neural network". Deep learning is a subset of machine learning. Deep learning techniques typically involve more neurons, more layers of neurons, more complex ways of connecting neurons/layers in the neural network, and/or the availability of high levels of computing power to train the neural network.

In a deep learning architecture, the output of intermediate neural network layers can be viewed as a representation of the original input data. Each layer uses the representation produced by a previous layer as input, and produces new representations as output. Deep learning architectures include convolutional neural networks (CNN), recurrent neural networks (RNN) and other deep neural networks.

Machine learning techniques may be supervised or unsupervised. Some machine learning techniques fall in between strictly supervised learning and strictly unsupervised learning. In supervised learning, a computer is presented with example inputs that are labeled with additional information. For example, the inputs may be classified or labeled with desired outputs. The computer is trained to create a mapping from inputs to outputs. Typically, the additional information allows the system to compute errors produced by the model. The errors are used as feedback in the learning process to improve the model. Typically, human effort is involved in labeling the data, such as by collecting or generating the example inputs and outputs. Classification is an example of a supervised learning task. The training data may be labeled with classifications (e.g. behavior data generated by a "Human" user, behavior data generated by an "Automated" user). One or more supervised learning techniques can be used to generate a model that can be used to classify new data (e.g. new behavior data may be classified as "Human" or "Automated").

In unsupervised learning, the computer is presented with unlabeled data. The computer is trained to learn structure in the input without the additional information that labeled data would provide. In some cases, the structure in the input is not readily apparent from evaluating the data using traditional techniques. Anomaly detection is an example of an unsupervised learning task. The training data may include of data that of a particular type (e.g. behavior data generated by human users). In some cases, the training data includes only data of the particular type. In other cases, a small number of outliers may be present in the training data. One or more unsupervised learning techniques can be used to generate a model that can be used to detect input data that is abnormal relative to the training data (e.g. behavior data can be detected that is NOT generated by human users).

Automation detection may be performed using one behavior model or multiple behavior models. When multiple behavior models are used for automation detection, the behavior models may be generated using the same machine learning techniques trained on different data sets, different machine learning techniques, or any combination thereof. In some embodiments, multiple behavior models are applied to each requests simultaneously, and decision is made based on ensembled models. Alternatively and/or in addition, multiple behavior models may be applied to generate a more robust result.

In some embodiments, a behavior model may be trained on training data that is specific to a particular request, such as a particular request that can be initiated from a particular webpage (e.g. a login request that can be initiated from the particular webpage). Alternatively and/or in addition, a behavior model may be trained on training data that is specific to a particular class of requests on multiple webpages (e.g. login requests from various login webpages of different domains). Alternatively and/or in addition, a behavior model may be trained on any other set of training data corresponding to any set of requests that from any number of website computing device/s 130 for different domains.

In some embodiments, a set of one or more automation detection devices 112 are assigned to perform automation detection on requests directed to a set of one or more website computing devices 130 for a particular domain. In this case, the behavior model 116 used by the set of one or more automation devices 112 may be trained using training data associated with the particular domain in some embodiments.

Non-limiting example embodiments using various deep learning techniques are described in greater detail hereinafter. Other deep learning techniques and/or machine learning techniques may be implemented for automation detection without departing from the spirit or the scope of automation detection as described herein.

Preprocessing Behavior Data

In some embodiments, the behavior data is preprocessed before use with behavior models. For example, behavior data in a training data set may be preprocessed before being used to train a behavior model. As another example, behavior data generated in associated with a request may be preprocessed before analyzing the behavior data using a trained behavior model to determine whether the request is an automated request.

Preprocessing may include generating a representation of behavior data that includes meaningful information in the context of machine learning techniques. In some embodiments, the preprocessed behavior data is formatted in a consistent manner that is more readily handled with machine learning techniques. For example, non-numerical data may be mapped to a numerical representation. In some embodiments, preprocessing involves calculating a more meaningful metric from the original behavior data. For example, the preprocessed mouse event representation and the preprocessed keystroke representation described hereinafter includes transition information describing the transition between adjacent events. In some embodiments, preprocessing involves grouping, or segmenting the user data into fewer categories.

In some embodiments, the preprocessing occurs at the client computing device/s 120. For example, behavior collection instructions executing at the client computing device/s 120 may preprocess the behavior data and transmit the behavior data associated with the corresponding requests in the preprocessed format. Alternatively and/or in addition, the automation detection computing device/s 112 may preprocess behavior data originating from the client computing device/s 120 before analyzing the behavior data using the behavior model 116.

Non-limiting example embodiments of preprocessing are described in greater detail hereinafter. In particular, embodiments of preprocessing for two types of input events is presented: mouse events and keystroke events. In these examples, embodiments are described for generating preprocessed mouse event data and preprocessed keystroke event data. Other types of preprocessed behavior data may be used for automation detection without departing from the spirit or the scope of the invention, such as but not limited to any combination of input event types, including any subset of mouse input types, and subset of keystroke event types, and any combination thereof.

Preprocessed Mouse Event Representation

Behavior data may include data that describes a series of mouse input events generated at a client computing device 120 in association with a request. Mouse input events may include mouse movements, mouse clicks and other mouse input events. In some embodiments, a series of mouse input events includes one or more individual mouse input events that can each be described with an event coordinate and an event timestamp. For example, when mouse input events are detected at the client computing device 120, behavior collection instructions executing at the client computing device 120 may obtain raw input data from an operating system of the client computing device 120 containing coordinate data and timestamp data.

Mouse input events are generated at a client computing device 120 when a human user uses a mouse input device. Mouse input events may also be generated by an automated process. In some embodiments, touchscreen inputs may be considered mouse input events, such as touch events, touch-and-move events, and other touchscreen input events. Alternatively and/or in addition, mouse input events may include touch pad inputs, joystick inputs, or inputs from any other input device that navigates a multi-dimensional space.

For example, a series of mouse input events may be generated in association with a login request. The series of mouse input events may include a movement from an initial point to a point in the "username" text field, a movement to a point in a "password" text field, and a movement to a "Log In" button that initiates the login request when the button is clicked.

In some embodiments, preprocessing behavior data includes generating transition data that describes transitions between mouse input events. In some embodiments, the preprocessed behavior data includes a set of one or more transition data sets. Each transition data set includes one or more data elements that describe the transition between two adjacent mouse input events in a series of mouse input events that is ordered by time. Although transition data elements are described by example, the transition data set may include data elements that describe non-transition aspects of one or more mouse input events. For example, in some embodiments, when the behavior data generated in association with a request includes N individual mouse input events, the preprocessed behavior data includes N−1 transition data sets.

Consider the example series of mouse input events generated in association with an example request:

1: $(x_1, y_1, t_1)$
2: $(x_2, y_2, t_2)$
3: $(x_3, y_3, t_3)$

This example series of mouse input events includes three individual mouse input events, each described by a 2-dimensional (x, y) coordinate and a timestamp.

This example series of mouse input events may be preprocessed to generate a series of transition data sets that describes the transition between a particular mouse input event and the next mouse input event in the series. The data elements in each transition data set may include information calculated from the original mouse input information (e.g. coordinate and timestamp), such as speed, velocity, angle, distance, duration, other information that may be calculated from the original mouse input information, and any combination thereof.

In the example, the data elements of each transition data set includes a speed, an angle, and a distance between mouse input events. The resulting preprocessed behavior data includes the following series of transition data sets:

$$\sqrt{(x_2-x_1)^2+(y_2-y_1)^2}/t_2-t_1, \theta_{[(x1, y1) \text{ to } (x1, y1)]},$$
$$\sqrt{(x_2-x_1)^2+(y_2-y_1)^2} \quad\quad 1:$$

$$\sqrt{(x_3-x_2)^2+(y_3-y_2)^2}/t_3-t_1, \theta_{[(x2, y2) \text{ to } (x3, y3)]},$$
$$\sqrt{(x_3-x_2)^2+(y_3-y_2)^2} \quad\quad 2:$$

In each transition data set i, the first transition data element describes a speed that the input device moves from $(x_i, y_i)$ to $(x_{i+1}, y_{i+1})$. The second transition data element describes an angle of movement θ from $(x_i, y_i)$ to $(x_{i+1}, y_{i+1})$. The third transition data element describes a distance between $(x_i, y_i)$ and $(x_{i+1}, y_{i+1})$.

In some embodiments, the preprocessed mouse event information is generated as a vector of N−1 transition data sets, where N is the number of mouse input events in the behavior data generated in association with a request. In some embodiments, each transition data set is generated as a vector of data elements. The preprocessed mouse event vector may be used as input to one or more machine learning techniques, which shall be described in greater detail hereinafter.

Preprocessed Keystroke Event Representation

Behavior data may include data that describes a series of keystroke events generated at a client computing device 120 in association with a request. Keystroke input events may include key presses, key releases, and other keyboard input events. In some embodiments, a series of keystroke input events includes one or more individual keystroke input events that can be described by a key identifier, an actuation motion (e.g. down/up, press/release) and an event timestamp. For example, when key input events are detected at the client computing device 120, behavior collection instructions executing at the client computing device 120 may obtain raw input data from an operating system of the client computing device 120 containing key identifier data, actuation motion data, and timestamp data.

Keystroke input events are generated at a client computing device 120 when a human user uses a keyboard input device. Keyboard input events may also be generated when an automated process operates on the client computing device 120. In some embodiments, touchscreen inputs may be considered keyboard input events, such as when a user and/or automated process interacts with a virtual keyboard (e.g. a keyboard image displayed on a display of the client computing device 120). Alternatively and/or in addition, keystroke input events may include physical keypad inputs or inputs from any other input device that involves physical or virtual key actuation.

For example, a series of keystroke input events may be generated in association with a login request. The series of keystroke input events may include typing the characters of a username in a "username" text field and typing the characters of a password into a "password" text field.

In some embodiments, preprocessing behavior data includes generating transition data that describes transitions between keystroke input events. In some embodiments, the preprocessed behavior data includes a set of one or more transition data sets. Each transition data element includes one or more data elements that describe the transition between two adjacent keystroke input events in a series of keystroke input events that is ordered by time. Although transition data elements are described by example, the transition data set may include data elements that describe non-transition aspects of one or more keystroke input events. For example, in some embodiments, when the behavior data generated in association with a request includes M individual keystroke input events, the preprocessed behavior data includes M−1 transition data sets.

For example, when a user types the word "Cat", the input can be described as the following series of events:

1: (Shift, down, $t_1$)
2: (c, down, $t_2$)
3: (c, up: $t_3$)
4: (Shift, up: $t_4$)
5: (a, down: $t_5$)
6: (a, up: $t_6$)
7: (t, down: $t_7$)
8: (t, up: $t_8$)

This example series of keystroke input events includes eight individual mouse keystroke events, each described by a key identifier, an actuation motion, and a timestamp.

This example series of keystroke input events may be preprocessed to generate a series of transition data sets that describes the transition between a particular keystroke input event and the next keystroke input event in the series. The data elements in each transition data set may include information calculated from the original keystroke input information (e.g. key identifier, actuation movement, and timestamp). Although one or more examples of preprocessed keystroke data are provided hereinafter, any set of data elements derived from the original keystroke information may be contemplated.

In the given example, the data elements in each transition data set include a key pair, an actuation movement pair, and a duration between keystroke input events. The resulting preprocessed behavior data includes the following series of transition data sets:

1: (Shift→c, down→down, $t_2-t_1$)
2: (c→c, down→up, $t_3-t_2$)
3: (c→Shift, up→up, $t_4-t_3$)
4: (Shift→a, up→down, $t_5-t_4$)
5: (a→a, down→up, $t_6-t_5$)
6: (a→t, up→down, $t_7-t_6$)
7: (t→t, down→up, $t_8-t_7$)

The first transition data element is a key pair indicating a transition from a keystroke input event involving the first key in the pair to a keystroke input event involving the second key in the pair. The second transition data element is an actuation movement pair indicating a transition from a keystroke input event involving the first actuation movement in the pair to a keystroke input event involving the second actuation movement in the pair. The third transition data element is a duration between two adjacent keystroke input events.

In some embodiments, a transition data element value may be represented with an index. For example, a keyboard with 101 keys can generate events with $101^2=10,201$ possible key pair values. Thus, the key pair of may be represented using 10,201 index values, such as integers in the range [0, 10,200]. Alternatively and/or in addition, given possible actuation values of "up" and "down", $2^2=4$ possible key pair values exist ("down→down", "down→up", "up→down", "up→up"). Thus, the key pair of may be represented using four index values, such as integers in the range [0, 3].

In some embodiments, a transition data element value may be segmented. As used herein, the term "segment" refers to the act of grouping or bucketing data. For example, data within a particular range may be grouped together. In the given example, the duration of each transition data set may be grouped by value into sets, such as "short", "medium-short", "medium", "medium-long", and "long". In this case, the duration may be represented using five index values, such as integers in the range [0-4].

In some embodiments, the preprocessed keystroke event information is generated as a vector of M−1 transition data sets. In some embodiments, each transition data set is generated as a vector of data elements. The preprocessed keystroke event vector may be used as input to one or more machine learning techniques, which shall be described in greater detail hereinafter.

In some embodiments, mouse clicks are considered keystroke events. For example, a mouse click may be defined by a mouse button identifier, an actuation motion (click or release), and a timestamp. In some embodiments, input from a single input device may be categorized as different input event classes and preprocessed in a different manner. Furthermore, an individual input event may be categorized in multiple event classes and preprocessed with the different event classes. For example, a mouse click event may be described by an event coordinate, an event timestamp, a mouse button identifier and an actuation motion. This mouse click event may be represented in preprocessed mouse event data as well as preprocessed keystroke event data. The event coordinate and event timestamp of the mouse click event will be used in generating the preprocessed mouse event data, while the mouse button identifier, actuation motion, and event timestamp of the mouse click event will be used in generating the preprocessed keystroke event data.

Segmenting Behavior Data

In some embodiments, for one or more sets of preprocessed behavior data, each possible transition data set value is mapped to a unique numerical identifiers, and the series of transition data sets is converted to a vector of unique numerical values. That is, the preprocessed keystroke event data is represented as a vector of values that each map to a possible transition data set in the universe of possible transition data sets. For example, when there are 101 different keys, two possible keystrokes actuation movements ("down" and "up"), and five possible durations ("short", "medium-short", "medium", "medium-long", and "long"), the number of possible transitions data sets is $101^2*2^2*5=204,020$.

In some embodiments, the universe of possible transition data sets is reduced by further segmentation of one or more data elements. Generally, segmentation may be determined with or without human intervention. For example, a segmentation scheme may be determined using one or more clustering techniques, one or more other algorithms, human knowledge, other known information, existing classifications, or any other factor.

For example, a segmentation scheme may be used on the different key identifiers. The keys may be divided into groups, such as characters, punctuation, numbers, modifier keys, function keys, and/or any other grouping.

When 5 key groupings and 5 time groupings are used, $5^2*2^2*3=300$ unique numerical identifiers are sufficient to represent all possible transitions. Using the 5 key groupings and the 5 time groupings, the example sequence keyboard event data may be represented as:

1: (Modifier→letter, down→down, medium)
2: (letter→letter, down→up, short)
3: (letter→Modifier, up→*up, short)
4: (Modifier→letter, up→down, medium)
5: (letter→letter, down→up, medium-short)
6: (letter→letter, up→down, short)
7: (letter→letter, down→up, medium-long)

In some embodiments, the segmentation scheme provides additional security by removing sensitive information from the behavior data. For example, if the phrase "Cat" is a password, it is not possible to reconstruct the password from the data that includes segmented key identifiers.

In the example segmentation scheme, the universe of possible transition data sets includes $5^2*2^2*5=500$ possible values. In some embodiments, the preprocessed keystroke event data is a vector of M−1 numerical indexes that map to the possible values of transition data sets, where M is the number of keystroke input events in the behavior data generated in association with a request.

Feature Extraction

Features are distinctive patterns that may be found in the input data. Feature extraction identifies such features in input data. Feature extraction can be manual, partially automated, or fully automated. For example, feature extraction may be used for facial detection in image processing. Feature extraction in an image may be assisted by providing manually-generated templates for one or more facial features, such as eyes, noses, mouths and ears. The manually-generated templates allow the incorporation of human knowledge into computer processes, such as the machine learning techniques for facial detection. Ideally, the manually-generated feature templates helps to train a model to learn properties of the facial features from training images and recognize the facial features in new images.

In machine learning, feature extraction starts from an initial set of input data and builds derived values, or features, that are intended to be informative and non-redundant. That is, the features extracted from the initial data capture the important and meaningful components of the data. Manually-assisted feature extraction may provide insights on unstructured data, but is not scalable and may bring assumptions to the table that may limit the accuracy of the resulting model.

When feature extraction techniques are applied to behavior data to generate a behavior model, the behavior model will output a representation of input behavior data that is similar to the input behavior data. However, the extracted features have the potential to be more useful than the input behavior data. For example, the extracted features can highlight essential characteristics of the behavior data. The output representation may also reduce the complexity of the input behavior data while still retaining essential characteristics.

Unsupervised Feature Extraction Using Deep Learning Techniques

Automated feature extraction may be performed using one or more unsupervised deep learning techniques. The unsupervised deep learning techniques automatically discover and learn representations for feature detection or classification from raw data without requiring human input. This allows a computing device to both learn the features of the data (as encoded by the trained model), and use the features (as encoded by the trained model) to perform a specific task.

As used herein, the term "latent feature" refers to one or more features that are automatically extracted using unsupervised machine learning techniques. Latent features may not be readily observed or interpreted by a human, such as a programmer who wishes to write explicit code or instructions to analyze the data in explicit, sequential steps. However, the latent features ideally capture the essential characteristics of the input data. Latent feature extraction can generate a representation of the input data that highlights unique and/or meaningful characteristics of the input data.

In some embodiments, unsupervised deep learning techniques are used for feature extraction using a training set of behavior data. For example, unsupervised deep learning techniques may be used to generate a model based on human-generated behavior data. The deep learning techniques train a behavior model to extract latent features from the training set of behavior data. In some embodiments, input training data includes preprocessed keystroke event data and preprocessed mouse event data associated with a plurality of requests.

The representation generated by a behavior model that extracts latent features may be used for automation detection, such as by the anomaly detection example described in greater detail hereinafter. Alternatively and/or in addition, the representation generated by a behavior model that extracts latent features may be used to compare the extracted features, such as in the fingerprinting example describe in greater detail hereinafter. Alternatively and/or in addition, the representation generated by a behavior model that extracts latent features may be used as input to subsequent neural networks, such as but not limited to the classification example described in greater detail hereinafter.

In some embodiments, deep learning techniques are applied to generate an autoencoder as a behavior model. An autoencoder is a neural network used for unsupervised learning of a representation or encoding of a set of data. An autoencoder may include an encoder and a decoder. The encoder uses training behavior data as input and produces a representation as output. The decoder uses the output from the encoder as input and reconstructs the original input data as output. Autoencoders are trained to minimize reconstruction error of reconstructed original input data from the decoder, allowing for unsupervised training of the autoencoder.

In some embodiments, the behavior model includes a variation of an autoencoder. For example, the behavior model may include a denoising autoencoder (that can handle partially corrupted input), a sparse autoencoder (that are configured to generate sparse representations), a variational autoencoder (that makes certain assumptions about the distribution of latent features), an adversarial autoencoder (that uses generative adversarial networks), a contractive autoencoder (that is robust to slight variations in input values), a stacked autoencoder (that includes multiple layers of sparse autoencoders), and other variations of an autoencoder.

Example: Behavior2Vec Model for Latent Feature Extraction

In some embodiments, the autoencoder (or other behavior model for feature extraction) is configured to compress input sequences of any length to a fixed length vector. For example, input behavior data corresponding to a request may include a vector of preprocessed keystroke event data of length M−1, a vector of preprocessed mouse event data of length N−1, or both vectors. The output of the autoencoder (or other behavior model) is a compressed numeric vector of a fixed length. Thus, the behavior model can be used to compress one or more sequences of complex behavior events into a fixed length numerical vector while effectively preserving the information from the original behavior events.

In subsequent examples, this trained behavior model is referred to as "Behavior2Vec model". For example, an autoencoder may be trained that includes a Behavior2Vec model as an encoder and a Vec2Behavior model as a decoder. In some embodiments, the autoencoder architecture is based on recurrent neural networks (RNN) or convolutional neural networks (CNN) or other deep learning architecture. The trained Behavior2Vec model can then be used to generate a latent feature vector of fixed length for any sequence of input events, including behavior data that includes any sequence of input events generated at a client device in association with a request.

Behavior Classification Using Deep Learning Techniques

Supervised deep learning techniques may be used to classify input data. The model is trained to associate some input with some output given a training set of labeled examples. In some embodiments, supervised deep learning techniques are used to train a behavior model that classifies input behavior data (e.g. behavior data generated in association with a request) as either human-generated or automation-generated. For example, the training data may include (i) a first plurality of labeled behavior data labeled as human-generated, where the behavior data was generated in association with human-initiated requests, and (ii) a second plurality of labeled behavior data labeled as automation-generated, where the behavior data was generated in association with automation-initiated requests. In some embodiments, classification is performed using a deep convolutional neural network (CNN), a deep recurrent neural network (RNN), or on another deep learning architecture.

For example, classification may be performed using the example Behavior2Vec model to generate a fixed-length vector representation. This representation simplifies behavior data before being input to the classifier model. For example, the output of Behavior2Vec may be fed into an RNN that is trained for classification. The labeled behavior data is used to train the RNN to classify behavior data. In some embodiments, the Behavior2Vec model connected to the RNN classifier model may be treated as a single model for training purposes. That is, the Behavior2Vec portion and the RNN classifier portion of the model may be trained simultaneously.

Anomaly Detection Using a Behavior Model

In some embodiments, anomaly detection is performed by evaluating the output of a behavior model generated using one or more unsupervised deep learning techniques. Anomaly detection is a technique for identifying data that deviate from the norm. For example, an autoencoder trained on human-generated behavior data should produce anomalous output when fed automation-generated behavior data as input.

In the example Behavior2Vec model, when behavior data is used as input to the trained model, the trained Behavior2Vec model outputs a fixed-length vector representation of the behavior data. That is, the representation of the behavior data may be visualized as a point in an L-dimensional space, where L is the length of the vector.

Various techniques can be used to compare a particular vector representation of particular behavior data to vector representations of behavior data that is known to be human-generated. In some embodiments, kernel density estimation techniques may be used to analyze vector representations of human-generated behavior data from the training set used for unsupervised training of the Behavior2Vec model. The distance of the particular vector representation from the vector representations of the training data set (e.g. in the L-dimensional space) is an indication of the degree to which the particular vector representation deviates from those of known human-generated behavior data from the training set.

Other Behavior Model Uses Based on Behavior2Vec Model

In some embodiments, the output of a behavior model such as the example Behavior2Vec model (or another behavior model, including another autoencoder-based behavior model) is used as input to one or more other computational techniques, which may include machine learning techniques as well as explicit programming techniques. For example, traditional classification algorithms may be used on the fixed-length vector representations generated by the Behavior2Vec model. For example, the output may be processed by the output vector representations, classifiers may be applied such as decision trees, logistic regression, support vector machines, and any other machine learning or explicit programming technique.

In some embodiments, the output of a behavior model such as the example Behavior2Vec model (or another behavior model, including another autoencoder-based behavior model) is used to detect credential stuffing. For example, during a login session, the behavior model may be used to generate a fixed-length vector representation of a user's behavior data. This fixed-length vector representation may be associated with the user to serve as a digital behavior fingerprint. Such digital behavior fingerprints are similar to among login sessions conducted by a same user, but quite different when a different user, including an automated user or a human user, attempts to log in with the user's credentials. The digital behavior fingerprints can be used to protect the user from a credential stuffing login attack by comparing a fixed-length vector representation generated by the behavior model with stored digital behavior fingerprints for the user that is logging in.

In-Line Security Server

Figure 2:
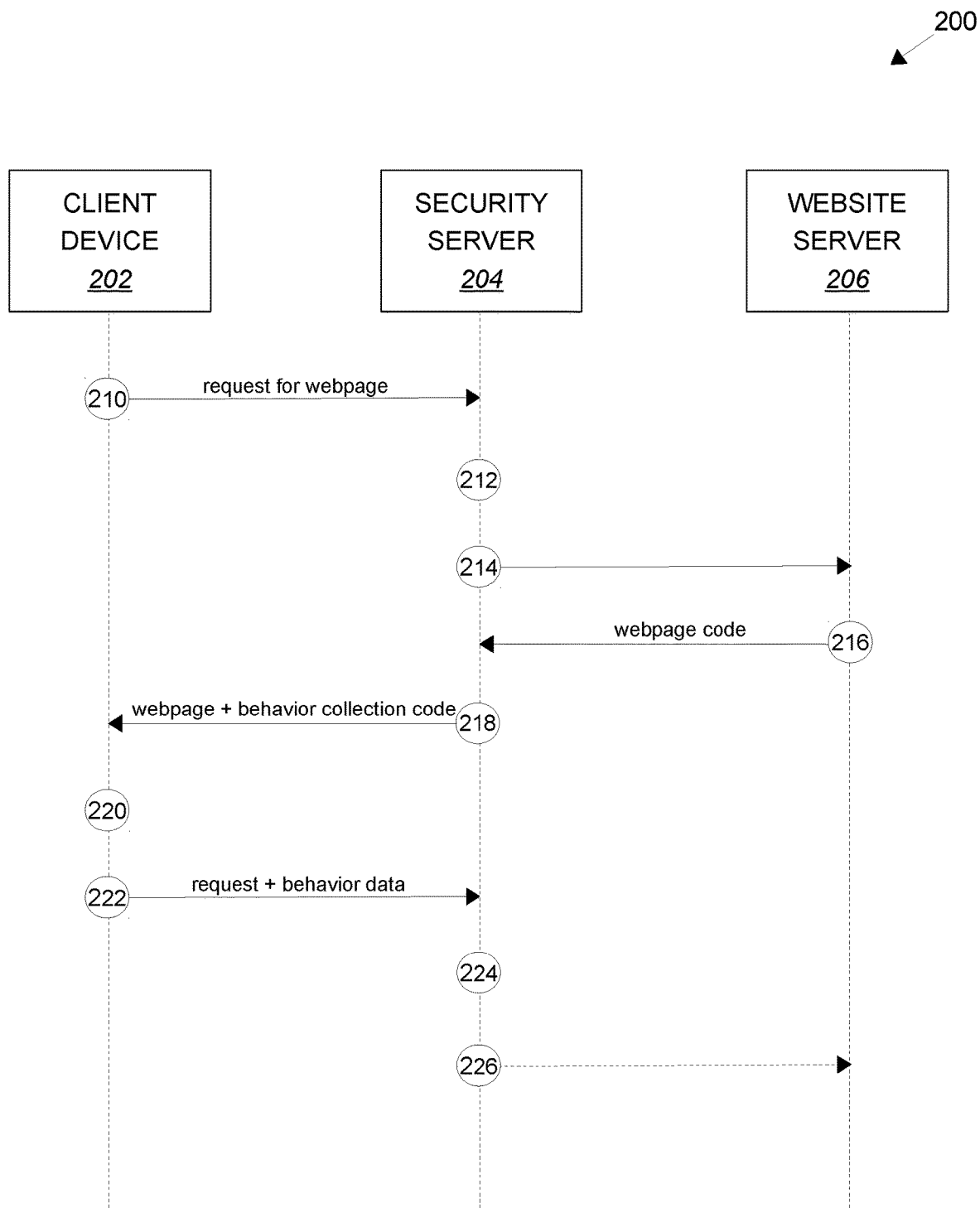
FIG. 2 is an activity diagram of a process for detection of malicious activity in an example embodiment that utilizes an in-line security server.

FIG. 2 is an activity diagram of a process for detection of malicious activity in an example embodiment that utilizes an in-line security server. Process 200 involves a client device 202, a security server 204, and a website server 206. The security server 204 is positioned in the network as an in-line device. In the in-line configuration, requests from the client device 202 are transmitted to the security server 204, which forwards valid requests for processing by the website server 206.

At step 210, a request for a webpage is initiated at the client device 202 and transmitted to the security server 204. At step 212, the security server 204 processes the request for the webpage. At step 214, the security server 204 forwards valid requests for the webpage to the website server 206. At step 216, the website server 206 returns the webpage code to the security server 204. At step 218, the security server 204 provides the webpage to the client device 202 in response to the request as well as behavior collection code that executes on the client device 202 and monitors behavior data at the client device 202. For example, the behavior collection code may monitor input events generated at the client device 202 in association with the webpage.

At step 220, a request is initiated at the client device 202. For example, a human user or an automated process may interact with the webpage in a manner that causes the executing behavior collection code to generate the request. At step 222, the request and behavior data generated in association with the request are transmitted to the security server 204. At step 224, the security server 204 analyzes the behavior data received in association with the request. For example, the security server 204 may use a behavior model to analyze the behavior data, and makes an automation determination regarding whether the request is an automated request.

At step 226, the security server 204 handles the request based on the automation determination for the particular request. For example, when the automation determination indicates that the particular request is an automated request, the security server 204 may divert the particular request such that the website server 206 does not receive the particular request, provide the website server 206 with the request and an indication that the request is automated, log the particular request, perform another action, and/or any combination thereof.

Out-of-Band Security Server

Figure 3:
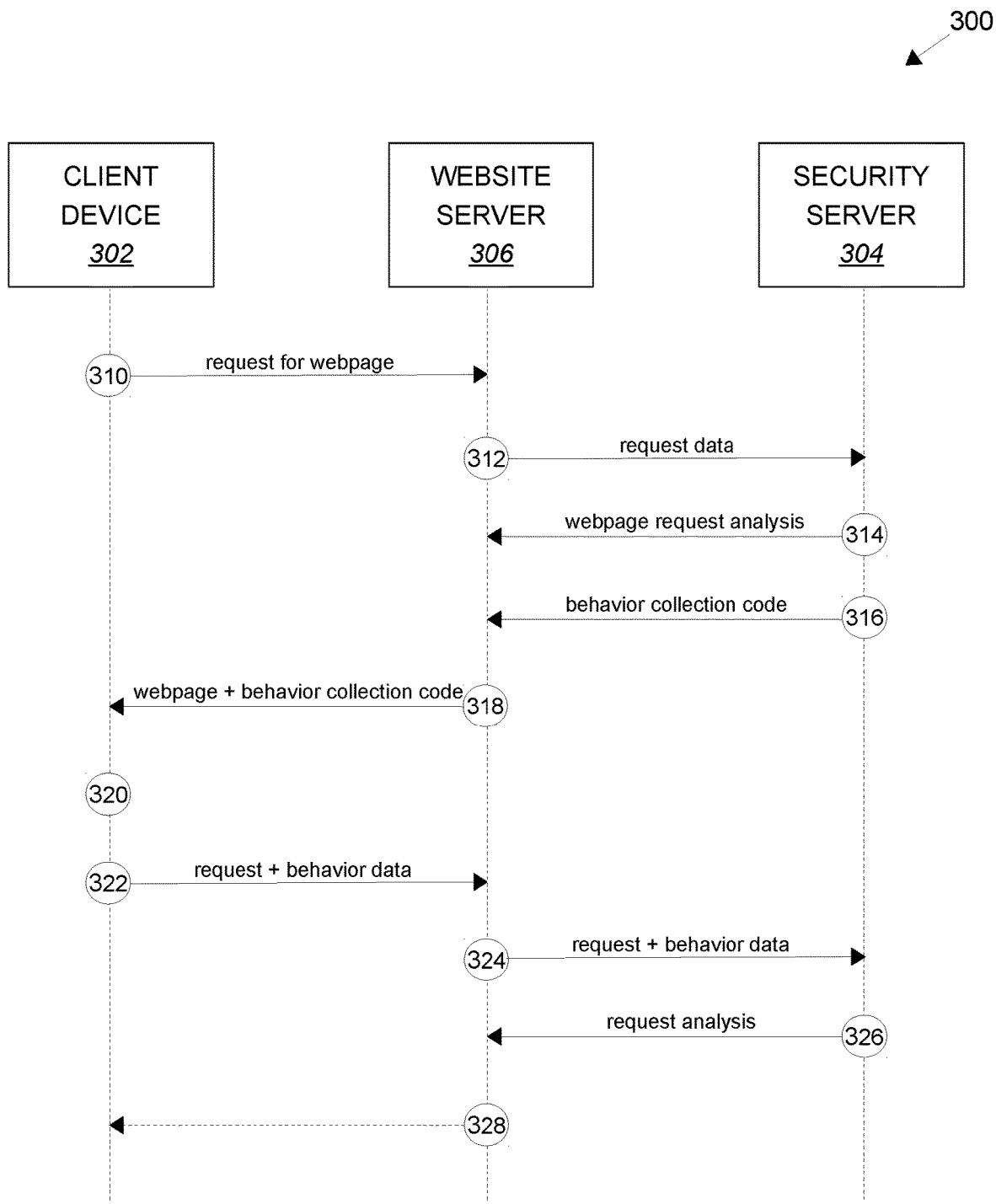
FIG. 3 is an activity diagram of a process for detection of malicious activity in an example embodiment that utilizes an out-of-band security server.

FIG. 3 is an activity diagram of a process for detection of malicious activity in an example embodiment that utilizes an out-of-band security server. Process 300 involves a client device 302, a security server 304, and a website server 306. The security server 304 is positioned in the network as an out-of-band device. In the out-of-band configuration, requests from the client device 302 are transmitted to the website server 306, which accesses the security server 304 for assistance in automation detection.

At step 310, a request for a webpage is initiated at the client device 302 and transmitted to the website server 306. At step 312, the security server 304 sends request data to the security server 304. At step 314, the security server 304 provides an analysis of the webpage request to the website server 306 indicating that the website request is valid. At step 316, the security server provides behavior collection code to the website server 306. At step 318, the website server 306 provides the webpage code and the behavior collection code to the client device 302.

At step 320, a request is initiated at the client device 302. For example, a human user or an automated process may interact with the webpage in a manner that causes executing webpage code to generate the request. At step 322, the request and behavior data generated in association with the request are transmitted to the website server 306. At step 324, the website server transmits data describing the request, including the behavior data, to the security server 304. At step 326, the security server 304 makes an automation determination regarding whether the request is an automated request and provides the analysis of the request (e.g. the automation determination) to the website server 306. At step 328, the website server 306 handles the request based on the automation determination for the particular request.

Integration with Additional Automation Factors

One or more automation detection computing devices 112 may use one or more other automation factors to determine whether a request is initiated by an automated process. In some embodiments, when behavior data associated with the request is analyzed using the behavior model 116, the behavior model result is one factor of multiple automation factors that are potentially used to analyze data describing a request. For example, the behavior data or other data describing the request may be analyzed using one or more algorithms or techniques outside of the behavior model 116.

In some embodiments, the automation detection module 114 analyzes data describing a particular request to determine one or more additional automation factors in addition to analyzing the corresponding behavior data using the behavior model 116 to generate a behavior model result. When the automation detection module 114 generates the automation determination indicating whether the request is initiated by an automated process, the automation detection module 114 considers the additional automation factor/s.

In some embodiments, the additional automation factors are considered when the behavior model result is not definitive. For example, when the behavior model result is a score that corresponds to a likelihood that the request was initiated by an automated process, the automation detection module 114 may evaluate the additional automation factors when the score is indicates a likelihood that is moderate rather than strong. In this case, one or more additional automation factors that also indicate that the request was initiated by an automated process may influence the final automation determination. Alternatively and/or in addition, some embodiments may use the behavior model 116 to generate and consider a behavior model result when another automation factor is not definitive.

In some embodiments, the additional automation factor/s include a rate-limiting factor. For example, the automation detection module 114 may determine a request rate for the particular client computing device 120 from which a particular request originated. In this case, the data describing the request includes the identity of the particular client computing device 120, which is usable to look up aggregate rate information for the particular client computing device 120. When the behavior model result indicates a moderate likelihood that the request was initiated by automation software, a suspicious rate of requests from the same client computing device 120 may be used to determine the final automation determination. Other automation factors that the automation detection module 114 may consider a rate limiting factor and/or other automation factors, such as but not limited to IP rate limiting, browser fingerprint rate limiting, and/or any other factor that can be evaluated to determine whether a request was initiated by an automated process.

Example Processes

Figure 4:
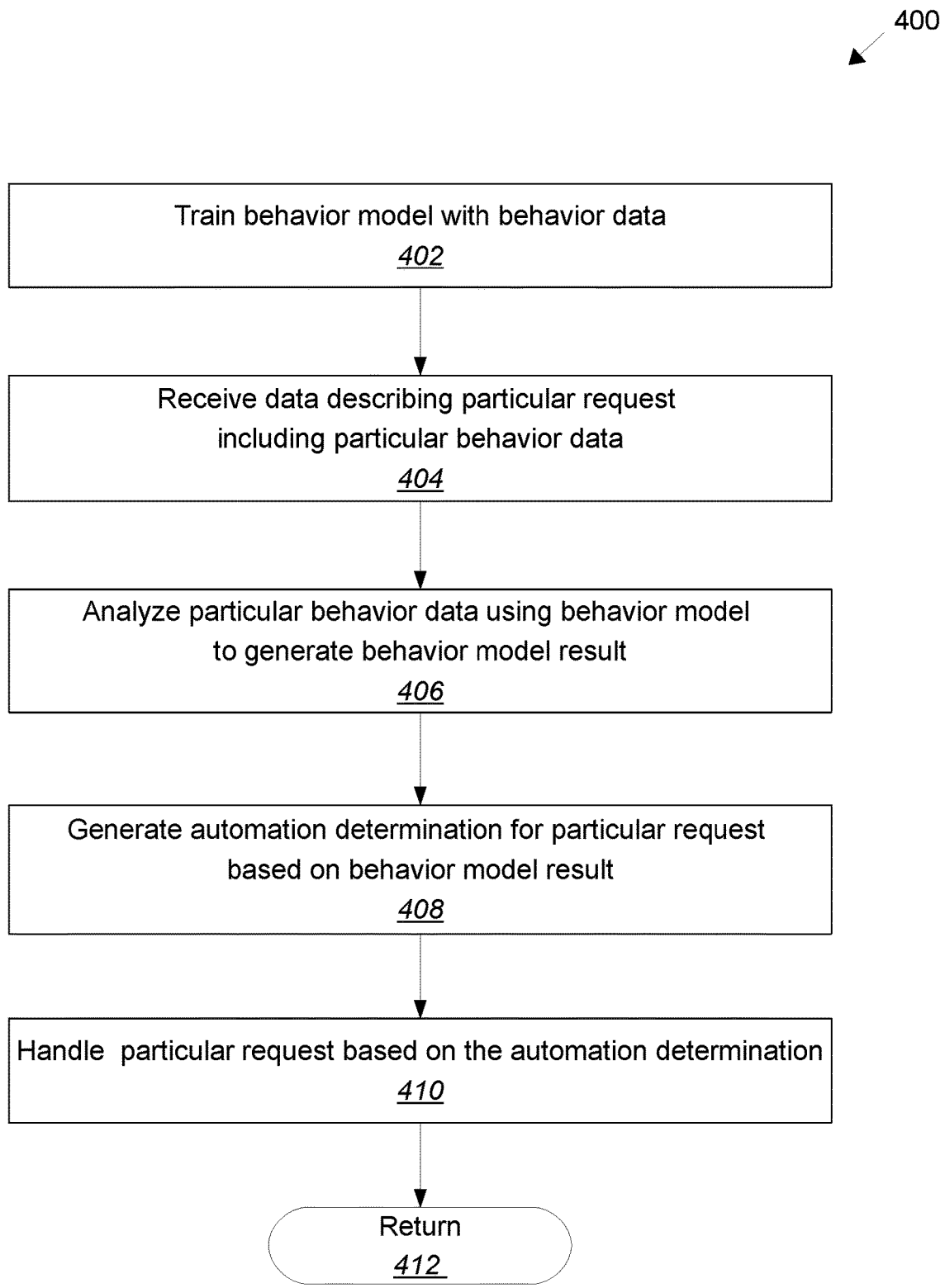
FIG. 4 is a flow diagram of a process for detection of malicious activity in an example embodiment.

FIG. 4 is a flow diagram of a process for detection of malicious activity in an example embodiment. Process 400 may be performed by one or more computing devices and/or processes thereof. For example, one or more blocks of process 400 may be performed by a network security system 110. In one embodiment, one or more blocks of process 400 are performed by an automation detection computing device 112 and a model generation module 118. Process 400 will be described with respect to a network security system 110, but is not limited to performance by a network security system 110.

At block 402, the network security system 110 trains a behavior model with behavior data corresponding to a plurality of requests. For example, the network security system may train a behavior model using one or more machine learning techniques, including one or more supervised learning techniques.

At block 404, the network security system 110 receives data describing a particular request from a particular client device to a server system hosting a website, the data including particular behavior data generated at the particular client device in association with the particular request. The behavior data may be generated by behavior collection instructions executing at the particular client device.

At block 406, the network security system 110 analyzes the particular behavior data using the behavior model to generate a behavior model result. For example, when the behavior model may be used for anomaly detection or classification as applied to the particular behavior data. In some embodiments, the network security system 110 generates a score that reflects a likelihood that the request is an automated request, as determined using the behavior model.

At block 408, the network security system 110 generates an automation determination for the particular request based on the behavior model result. The automation determination indicates whether the particular request is initiated by an automated process, as determined by the network security system 110. In some embodiments, the automation determination is generated based on one or more additional automation factors.

At block 410, the network security system 110 handles the particular request based on the automation determination for the particular request. For example, when the automation determination indicates that the particular request is an automated request, the network security system 110 may divert the particular request such that the server system does not receive the particular request, instruct the server system not to process the particular request, provide the server system the automation determination corresponding to the particular request, log the particular request, perform another action, and/or any combination thereof. When the automation determination indicates that the particular request is not an automated request, the network security system 110 may transmit the particular request to the server system, instruct the server system to process the particular request, provide the server system the automation determination corresponding to the particular request, log the particular request, perform another action, and/or any combination thereof.

At block 412, process 400 returns and/or terminates. For example, process 400 may pass control to a calling process, generate any appropriate record or notification, return after a method or function invocation, process data describing another request that includes behavior data, or terminate.

Implementation Mechanisms—Hardware Overview

According to some embodiments, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 5:
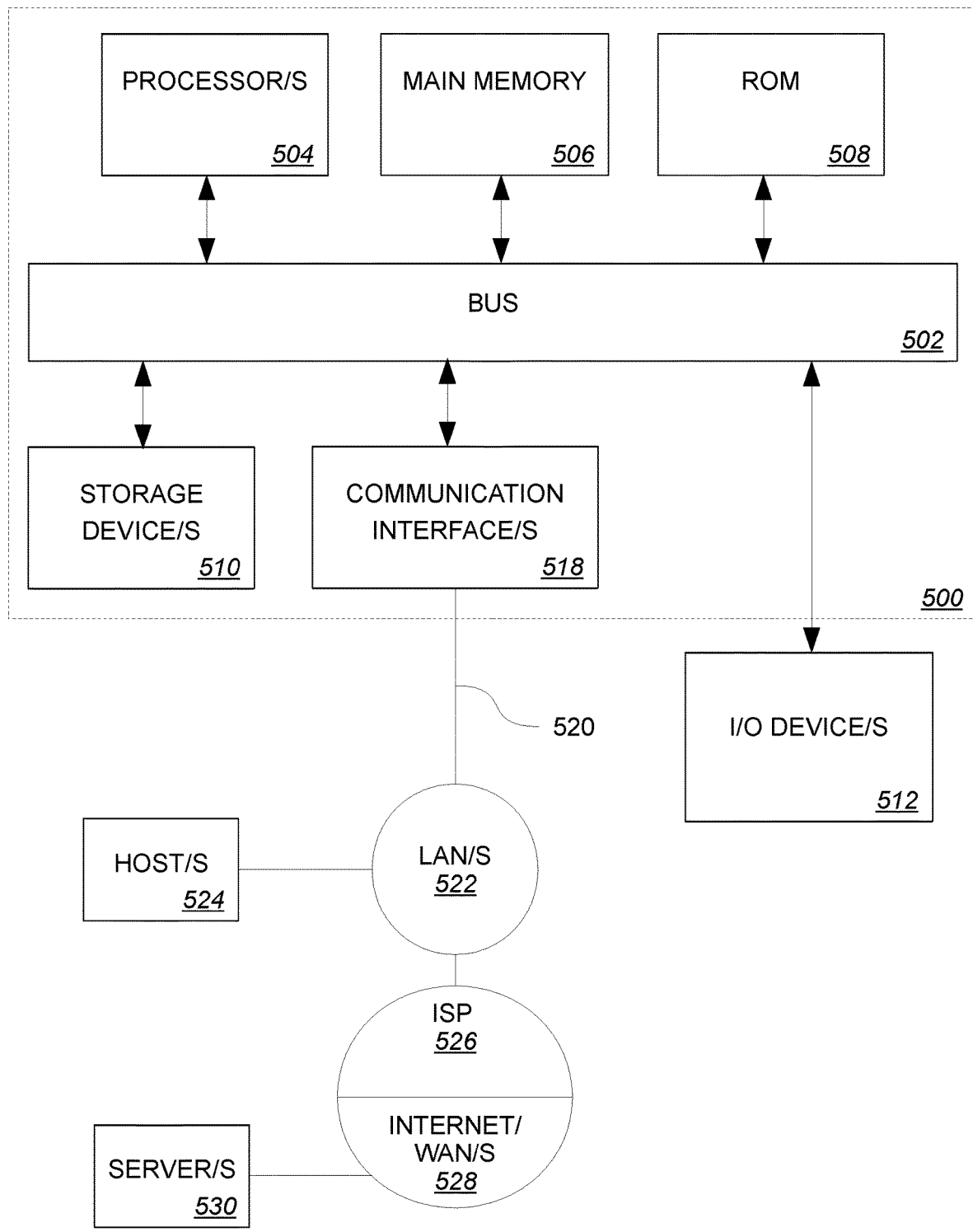
FIG. 5 illustrates a computer system upon which an embodiment may be implemented.

For example, FIG. 5 illustrates a computer system upon which an embodiment may be implemented. Computer system 500 includes a bus 502 or other communication mechanism for communicating information, and one or more hardware processors 504 coupled with bus 502 for processing information, such as basic computer instructions and data. Hardware processor/s 504 may include, for example, one or more general-purpose microprocessors, graphical processing units (GPUs), coprocessors, central processing units (CPUs), and/or other hardware processing units.

Computer system 500 also includes one or more units of main memory 506 coupled to bus 502, such as random access memory (RAM) or other dynamic storage, for storing information and instructions to be executed by processor/s 504. Main memory 506 may also be used for storing temporary variables or other intermediate information during execution of instructions to be executed by processor/s 504. Such instructions, when stored in non-transitory storage media accessible to processor/s 504, turn computer system 500 into a special-purpose machine that is customized to perform the operations specified in the instructions. In some embodiments, main memory 506 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 500 may further include one or more units of read-only memory (ROM) 508 or other static storage coupled to bus 502 for storing information and instructions for processor/s 504 that are either always static or static in normal operation but reprogrammable. For example, ROM 508 may store firmware for computer system 500. ROM 508 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 510, such as a magnetic disk or optical disk, is provided and coupled to bus 502 for storing information and/or instructions. Storage device/s 510 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 500 may be coupled via bus 502 to one or more input/output (I/O) devices 512. For example, I/O device/s 512 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 512 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 504 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some embodiments, the one or more I/O device/s 512 may include a device with combined I/O functionality, such as a touch-enabled display.

Other I/O device/s 512 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 504 over bus 502.

Computer system 500 may implement the techniques described herein using customized hard-wired logic, one or more ASICs or FPGAs, firmware or program logic which, in combination with the computer system causes or programs, causes computer system 500 to be a special-purpose machine. According to one embodiment, the techniques herein are performed by computer system 500 in response to processor/s 504 executing one or more sequences of one or more instructions contained in main memory 506. Such instructions may be read into main memory 506 from another storage medium, such as one or more storage device/s 510. Execution of the sequences of instructions contained in main memory 506 causes processor/s 504 to perform the process steps described herein. In alternative embodiments, hard-wired circuitry may be used in place of or in combination with software instructions.

Computer system 500 also includes one or more communication interfaces 518 coupled to bus 502. Communication interface/s 518 provide two-way data communication over one or more physical or wireless network links 520 that are connected to a local network 522 and/or a wide area network (WAN), such as the Internet. For example, communication interface/s 518 may include an integrated services digital network (ISDN) card, cable modem, satellite modem, or a modem to provide a data communication connection to a corresponding type of telephone line. Alternatively and/or in addition, communication interface/s 518 may include one or more of: a local area network (LAN) device that provides a data communication connection to a compatible local network 522; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 528); and other networking devices that establish a communication channel between computer system 500 and one or more LANs 522 and/or WANs.

Network link/s 520 typically provides data communication through one or more networks to other data devices. For example, network link/s 520 may provide a connection through one or more local area networks 522 (LANs) to one or more host computers 524 or to data equipment operated by an Internet Service Provider (ISP) 526. ISP 526 in turn provides connectivity to one or more wide area networks 528, such as the Internet. LAN/s 522 and WAN/s 528 both use electrical, electromagnetic or optical signals that carry digital data streams. The signals through the various networks and the signals on network link/s 520 and through communication interface/s 518 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its main memory 506 and send the instructions over a telecommunications line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 can send messages and receive data, including program code, through the network(s), network link 520 and communication interface 518. In the Internet example, one or more servers 530 might transmit signals corresponding to data or instructions requested for an application program executed by the computer system 500 through the Internet 528, ISP 526, local network 522 and a communication interface 518. The received signals may include instructions and/or information for execution and/or processing by processor/s 504. Processor/s 504 may execute and/or process the instructions and/or information upon receiving the signals by accessing main memory 506, or at a later time by storing them and then accessing them from storage device/s 510.

OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a network security system comprising one or more network security apparatuses, client devices, or server devices, the method comprising:

training a behavior model with behavior data generated in association with a plurality of requests;
receiving data describing a particular request from a particular client to a server hosting a website, the data including particular behavior data generated at the particular client in association with the particular request, wherein the received data has been preprocessed by the particular client to reformat for machine learning the particular behavior data comprising mouse event data and keystroke event data;
analyzing the particular behavior data using the behavior model to generate a behavior model result comprising a score indicating a likelihood that the received particular request is an automated request, wherein the analyzing further comprises:
responsive to determining that the generated score in the behavior model result indicates the likelihood of the received particular request being the automated request is indefinite,
analyzing the particular behavior data by evaluating additional automation factor data to further determine when the received particular request is initiated by an automation process;
generating an automation determination for the particular request based on the analysis; and
handling the particular request based on the automation determination for the particular request.

2. The method of claim 1, wherein the behavior model is trained using one or more unsupervised learning techniques and a training set of behavior data generated in association with a plurality of non-automated requests.

3. The method of claim 2, wherein the automation determination is made by using the behavior model for anomaly detection.

4. The method of claim 2, wherein the behavior model is an autoencoder, a recurrent neural network, or a convolutional neural network.

5. The method of claim 1,
wherein the behavior model is a classification model that is trained on a training set comprising labeled behavior data generated in association with a plurality of automation-initiated requests and labeled behavior data generated in association with a plurality of human-initiated requests;
wherein the automation determination is a classification determination that is generated when the behavior model is applied to the particular behavior data.

6. The method of claim 1, further comprising:
providing behavior collection code for execution at the particular client, wherein the behavior collection code, when executed at the particular client, causes the particular client to collect the particular behavior data at the particular client in association with the particular request.

7. The method of claim 6,
wherein the receiving data describing the particular request from the particular client comprises receiving the particular request and the particular behavior data from the particular client;
wherein the particular behavior data is generated by execution of the behavior collection code at the particular client.

8. A computer system comprising:
one or more hardware processors;
a memory coupled to the one or more hardware processors and storing one or more instructions which, when executed by the one or more hardware processors, cause the one or more hardware processors to:

train a behavior model with behavior data generated in association with a plurality of requests;

receive data describing a particular request from a particular client to a server hosting a website, the data including particular behavior data generated at the particular client in association with the particular request, wherein the received data has been preprocessed by the particular client to reformat for machine learning the particular behavior data comprising mouse event data and keystroke event data;

analyze the particular behavior data using the behavior model to generate a behavior model result comprising a score indicating a likelihood that the received particular request is an automated request, wherein the analyzing further comprises:

responsive to determining that the generated score in the behavior model result indicates the likelihood of the received particular request indefinite, analyzing the particular behavior data by evaluating additional automation factor data to further determine when the received particular request is initiated by an automation process;

generate an automation determination for the particular request based on the analysis; and handle the particular request based on the automation determination for the particular request.

9. The computer system of claim 8, wherein the behavior model is trained using one or more unsupervised learning techniques and a training set of behavior data generated in association with a plurality of non-automated requests.

10. The computer system of claim 9, wherein the automation determination is made by using the behavior model for anomaly detection.

11. The computer system of claim 9, wherein the behavior model is an autoencoder, a recurrent neural network, or a convolutional neural network.

12. The computer system of claim 8, wherein the behavior model is a classification model that is trained on a training set comprising labeled behavior data generated in association with a plurality of automation-initiated requests and labeled behavior data generated in association with a plurality of human-initiated requests;

wherein the automation determination is a classification determination that is generated when the behavior model is applied to the particular behavior data.

13. The computer system of claim 8, wherein the one or more instructions, when executed by the one or more hardware processors, cause the one or more hardware processors to:

provide behavior collection code for execution at the particular client, wherein the behavior collection code, when executed at the particular client, causes the particular client to collect the particular behavior data at the particular client in association with the particular request.

14. The computer system of claim 13, wherein the receiving data describing the particular request from the particular client comprises receiving the particular request and the particular behavior data from the particular client;

wherein the particular behavior data is generated by execution of the behavior collection code at the particular client.

15. A non-transitory computer readable medium having stored thereon instructions for service chain management comprising executable code which when executed by one or more processors, causes the one or more processor devices to:

train a behavior model with behavior data generated in association with a plurality of requests;

receive data describing a particular request from a particular client to a server hosting a website, the data including particular behavior data generated at the particular client in association with the particular request, wherein the received data has been preprocessed by the particular client to reformat for machine learning the particular behavior data comprising mouse event data and keystroke event data;

analyze the particular behavior data using the behavior model to generate a behavior model result comprising a score indicating a likelihood that the received particular request is an automated request, wherein the analyzing further comprises:

responsive to determining that the generated score in the behavior model result indicates the likelihood of the received particular request indefinite, analyzing the particular behavior data using by evaluating additional automation factor data to further determine when the received particular request is initiated by an automation process;

generate an automation determination for the particular request based on the analysis; and handle the particular request based on the automation determination for the particular request.

16. The non-transitory computer readable medium of claim 15, wherein the automation determination is made by using the behavior model for anomaly detection.

17. The non-transitory computer readable medium of claim 15, wherein the behavior model is trained using one or more unsupervised learning techniques and a training set of behavior data generated in association with a plurality of non-automated requests.

18. The non-transitory computer readable medium of claim 15, wherein the behavior model is an autoencoder, a recurrent neural network, or a convolutional neural network.

19. The non-transitory computer readable medium of claim 15, wherein the behavior model is a classification model that is trained on a training set comprising labeled behavior data generated in association with a plurality of automation-initiated requests and labeled behavior data generated in association with a plurality of human-initiated requests;

wherein the automation determination is a classification determination that is generated when the behavior model is applied to the particular behavior data.

20. The non-transitory computer readable medium of claim 15, wherein the executable code when executed by the one or more processors further causes the one or more processors to:

provide behavior collection code for execution at the particular client, wherein the behavior collection code, when executed at the particular client, causes the particular client to collect the particular behavior data at the particular client in association with the particular request.

21. The non-transitory computer readable medium of claim 20,
wherein the receive data describing the particular request from the particular client comprises receiving the particular request and the particular behavior data from the particular client;
wherein the particular behavior data is generated by execution of the behavior collection code at the particular client.

22. A network security system, comprising one or more network security apparatuses, client devices, or server devices with memory comprising programmed instructions stored thereon and one or more processor devices configured to be capable of executing the stored programmed instructions to:
train a behavior model with behavior data generated in association with a plurality of requests;
receive data describing a particular request from a particular client to a server hosting a website, the data including particular behavior data generated at the particular client in association with the particular request, wherein the received data has been preprocessed by the particular client to reformat for machine learning the particular behavior data comprising mouse event data and keystroke event data;
analyze the particular behavior data using the behavior model to generate a behavior model result comprising a score indicating a likelihood that the received particular request is an automated request, wherein the analyzing further comprises:
responsive to determining that the generated score in the behavior model result indicates the likelihood of the received particular request indefinite,
analyzing the particular behavior data by evaluating additional automation factor data to further determine when the received particular request is initiated by an automation process;
generate an automation determination for the particular request based on the analysis; and
handle the particular request based on the automation determination for the particular request.

23. The system of claim 22, wherein the automation determination is made by using the behavior model for anomaly detection.

24. The system of claim 22, wherein the behavior model is trained using one or more unsupervised learning techniques and a training set of behavior data generated in association with a plurality of non-automated requests.

25. The system of claim 22, wherein the behavior model is an autoencoder, a recurrent neural network, or a convolutional neural network.

26. The system of claim 22,
wherein the behavior model is a classification model that is trained on a training set comprising labeled behavior data generated in association with a plurality of automation-initiated requests and labeled behavior data generated in association with a plurality of human-initiated requests;
wherein the automation determination is a classification determination that is generated when the behavior model is applied to the particular behavior data.

27. The system of claim 22, wherein the one or more processors are further configured to be capable of executing the stored programmed instructions to:
provide behavior collection code for execution at the particular client, wherein the behavior collection code, when executed at the particular client, causes the particular client to collect the particular behavior data at the particular client in association with the particular request.

28. The system of claim 27,
wherein the receive data describing the particular request from the particular client comprises receiving the particular request and the particular behavior data from the particular client;
wherein the particular behavior data is generated by execution of the behavior collection code at the particular client.

* * * * *